US007973999B2

(12) United States Patent
Wang et al.

(10) Patent No.: US 7,973,999 B2
(45) Date of Patent: Jul. 5, 2011

(54) SYSTEM FOR ON-CHIP ACTUATION

(75) Inventors: Jianbai Wang, Allen, TX (US); James D. Huffman, Plano, TX (US); Paulo Pinheiro, Frisco, TX (US)

(73) Assignee: Texas Instruments Information, Dallas, TX (US)

(*) Notice: Subject to any disclaimer, the term of this patent is extended or adjusted under 35 U.S.C. 154(b) by 149 days.

(21) Appl. No.: 12/366,809

(22) Filed: Feb. 6, 2009

(65) Prior Publication Data

US 2010/0202037 A1    Aug. 12, 2010

(51) Int. Cl.
 *G02B 26/00*    (2006.01)
(52) U.S. Cl. .................................. 359/290; 359/291
(58) Field of Classification Search .......... 359/290–298, 359/318, 619–623
 See application file for complete search history.

(56) References Cited

U.S. PATENT DOCUMENTS

| | | | | |
|---|---|---|---|---|
| 6,819,470 | B2 * | 11/2004 | Meier et al. | 359/291 |
| 7,011,415 | B2 * | 3/2006 | DiCarlo et al. | 353/99 |
| 7,324,097 | B2 * | 1/2008 | Koyama et al. | 345/204 |
| 7,548,365 | B2 * | 6/2009 | Huffman et al. | 359/291 |

OTHER PUBLICATIONS

W. C. Tang et al., "Laterally driven polysilicon resonant microstructures," *Proceedings of IEEE Micro Electro Mechanical Systems (An Investigation of Micro Structures, Sensors, Actuators, Machines and Robots)*, pp. 53-59, Feb. 20-22, 1989.

Z. J. Yao et al., "Micromachined low-loss Microwave Switches," *IEEE J. Microelectromech. Systems*, vol. 8, pp. 129-124, Jun. 1999.
S. Pacheco, et al., "Design of low actuation voltage RF MEMS switch," *IEEE MIT-S International Microwave Symposium Digest*, Box, MA, Jun. 2000, pp. 165-158.
Y. L. Huang, et al., "Comparison of conventional and collapsed region operation of capacitive micromachined ultrasonic transducers," *IEEE Transactions on Ultrasonics, Ferroelectrics and Frequency Control*, vol. 53, No. 10, Oct. 2006, pp. 1918-1932.
P. F. Van Kessel et al., "A MEMS-based projection display," *Proceedings of the IEEE*, vol. 86, No. 8, Aug. 1998, pp. 1687-1704.
J. Huffman et al., "Next Generation Pixel Scaling for the Digital Micromirror Device," *IEEE Bipolar/BiCMOS Circuits and Technology Meeting*, 2005, pp. 163-168, Oct. 2005.
S. Pendharkar et al., "7 to 30V state-of-art power device implementation in 0.25 μm LBC7 BiCMOS-DMOS process technology," *Proceedings of International Symposium on Power Semiconductor Devices & ICs*, May 12-14, 2004, pp. 419-422.

(Continued)

*Primary Examiner* — Mohammed Hasan
(74) *Attorney, Agent, or Firm* — Charles A. Brill; Wade James Brady, III; Frederick J. Telecky, Jr.

(57) ABSTRACT

In accordance with particular embodiments, a system for displaying modulated light includes a spatial light modulator comprising a plurality of micromirrors having a pixel pitch less than 17 micrometers. The system also includes an intermediate voltage generator operable to generate a negative voltage and a positive voltage. The system further includes at least two level shifters coupled to the intermediate voltage generator. The system additionally includes a reset driver coupled to the at least two level shifters and to at least a subset of the plurality of micromirrors. The reset driver is operable to drive the subset of the micromirrors. The spatial light modulator, the intermediate voltage generator, the at least two level shifters, and the reset driver are all incorporated on a common substrate.

20 Claims, 4 Drawing Sheets

OTHER PUBLICATIONS

D. Pan et al., "A Low Voltage to High Voltage Level Shifter Circuit for MEMS Application," *Proceedings of the 15th Biennial University/Government/Industry microelectronics Symposium*, Jun. 30, 2003, pp. 128-131, May.

* cited by examiner

SYSTEM FOR ON-CHIP ACTUATION

TECHNICAL FIELD

This disclosure relates generally to display systems, and more particularly to a system for on-chip actuation.

BACKGROUND

Electrostatic actuation is one of the most commonly used mechanisms for providing force or displacement on a micrometer scale. Devices, such as interdigitated comb-drive actuators, shunt or series switches and capacitive micro-machined ultrasound transducer (CMUT) arrays, rely on electrostatic force to generate actuation at different frequency bands. Micro-machined electrostatic actuators normally need a relatively high voltage bias (typically around 30-50 volts, but sometimes exceeding 100 volts).

A Digital Micromirror Device (DMD) is another micro-machined device using electrostatically actuated mirrors to modulate light. It is used in projectors, high-definition TVs and digital cinemas. Electrostatic forces are generated between the mirror and the underlying complimentary memory electrodes to provide torsional rotation on the mirror hinges causing the mirror to tilt.

DMDs have traditionally been actuated using a bipolar reset waveform between −26 volts and 26 volts. Although memory and digital control electronics have long been integrated underneath the micromirror array, these high-voltage reset waveforms applied on the mirrors have traditionally been provided by a separate power-management and pulse-generation chip, which is packaged in a hybrid configuration and synchronized with the DMD chip through an embedded processor. The synchronization process and packaging parasitics fundamentally limit not only the slew rate, pulse width and separation duration of the reset pulses but also its synchronization with address electrode signals, seriously degrading the mirror dynamics.

SUMMARY

In accordance with particular embodiments, a system for displaying modulated light includes a spatial light modulator comprising a plurality of micromirrors having a pixel pitch less than 17 micrometers. The system also includes an intermediate voltage generator operable to generate a negative voltage and a positive voltage. The system further includes at least two level shifters coupled to the intermediate voltage generator. The system additionally includes a reset driver coupled to the at least two level shifters and to at least a subset of the plurality of micromirrors. The reset driver is operable to drive the subset of the micromirrors. The spatial light modulator, the intermediate voltage generator, the at least two level shifters, and the reset driver are all incorporated on a common substrate.

Depending on the specific features implemented, particular embodiments may exhibit all, some, or none of the following technical advantages. A technical advantage of particular embodiments is providing for the actuation of, for example, a micromirror using a reset waveform generated on the same microchip containing the micromirror.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments, and for further features and advantages thereof, reference is now made to the following description taken in conjunction with the accompanying drawings, in which.

DETAILED DESCRIPTION OF EXAMPLE EMBODIMENTS

In accordance with particular embodiments, a system for on-chip actuation is provided. Various embodiments may allow for a micro electro mechanical (MEM) device to be actuated using reset drivers contained on the same chip as the MEM device being actuated. For example, in particular embodiments, a micromirror may be actuated (tilted) via reset drivers on the same digital micromirror device (DMD) microchip. Particular examples specified throughout this document are intended for example purposes only, and are not intended to limit the scope of the present disclosure.

Figure 1:
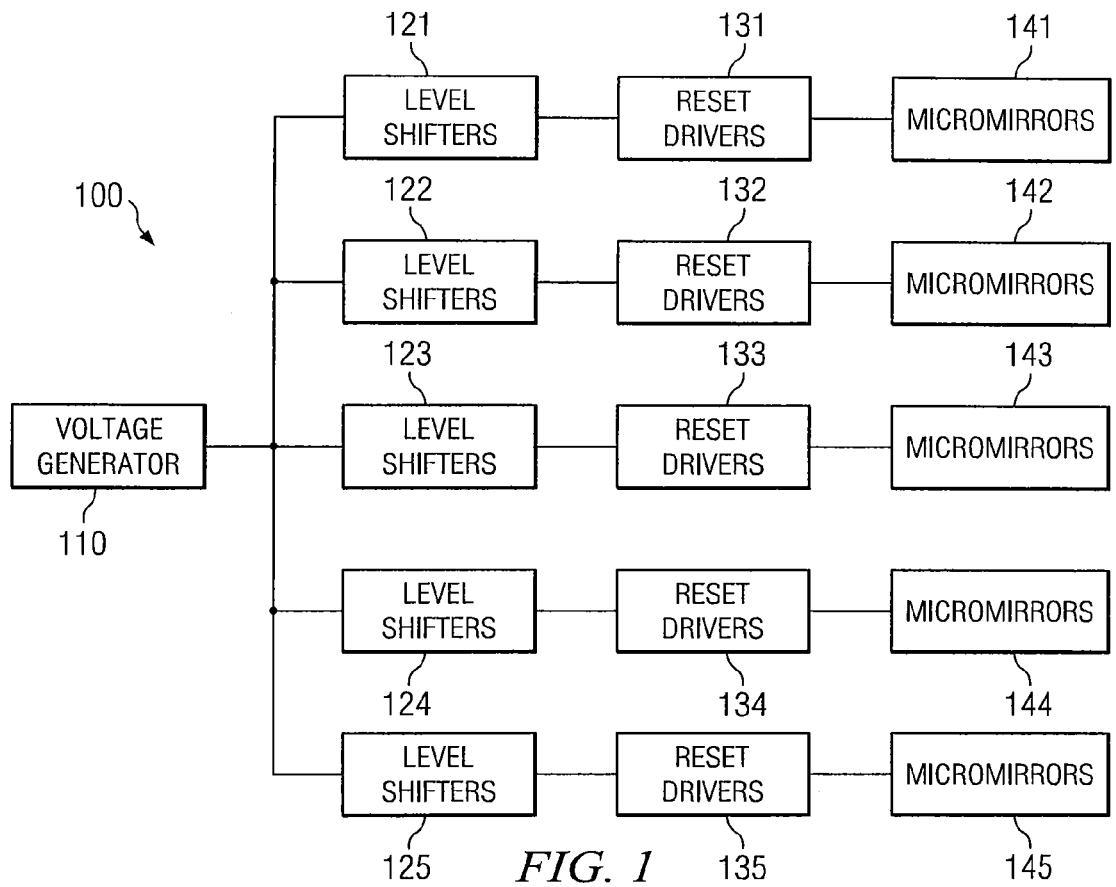
FIG. 1 is a block diagram of an embedded architecture for providing on-chip micromirror actuation, according to particular embodiments.

FIG. 1 is a block diagram of an embedded architecture for providing on-chip micromirror actuation, according to particular embodiments. The architecture depicted in FIG. 1 includes voltage generator 110, level shifters 121-125, drivers 131-135, and micromirror arrays 141-145. Each of these components may be found together on a single chip. These components may work together to allow micromirror arrays 141-145 to be driven between an "on" state and an "off" state locally without the need for a second external chip. While five sets of components are depicted, the actual number of sets used may vary depending on the application and scenario.

Voltage generator 110 may comprise one or more voltage generators operable to produce intermediate voltages (e.g., VMIDP (11 volts) and VMIDN (−3 volts)). The voltages produced by voltage generator 110 may be different from the supply voltage. In particular embodiments, voltage generator 110 may comprise multiple separate voltage generators arranged in a resistive ladder configuration. The generators may be coupled with an enabling transistor and diode-connected transistors. In such an embodiment, the output stages may be sized sufficiently to maintain the generated voltages within desired reliability tolerances. In particular embodiments, the voltage generator for VMIDP may comprise a diode-connected Positive-Channel Metal Oxide Semiconductor (PMOS) that is connected with a resistive ladder to ensure that, for example, VMIDP is higher than VOFS (e.g., 8.5 volts). This may be true even when VBIAS (e.g., 16 volts) is close to VOFS. In some embodiments, the current consumption of the output stages may be optimized so as to be able to sufficiently stabilize the generated voltages within predetermined long-term reliability tolerances. To maintain a low current budget during operation, it may be desirable to reduce the DC currents from voltage generator 110. The current used by voltage generator 110 may be minimized as far as it is sufficient to stabilize the generated voltages and avoid transistor reliability violation.

Each one of level shifters 121-125 may comprise one or more comparators and/or RC circuits. For example, a single four-transistor comparator or multi-stage comparators may be used to shift an input digital signal to an analog signal whose range does not necessarily overlap with that of the input signal. Comparator-based level shifters are relatively small, may result in sharp transition edges and may meet the reliability constraints conveniently by keeping the difference between the voltage rails within tolerances. However, the comparators may need extra intermediate voltages as power rails which may require additional current consumption. For example, to generate a high-end shifted signal (e.g., VMIDP, VBIAS), a voltage between VMIDP and VBIAS may need to be generated as the rail for one of the intermediate comparator stages. The same situation may apply to a low-end signal (e.g., VRST (e.g., −10 volts), VMIDN) as well.

In another example arrangement of level shifter components, level shifters 121-125 may comprise several comparators used along with RC circuits. The use of the RC circuits may decrease the number of intermediate voltages that are needed. Thus, the RC circuits and comparators may be applied together to offer simple low-power level shifting.

Figure 2:
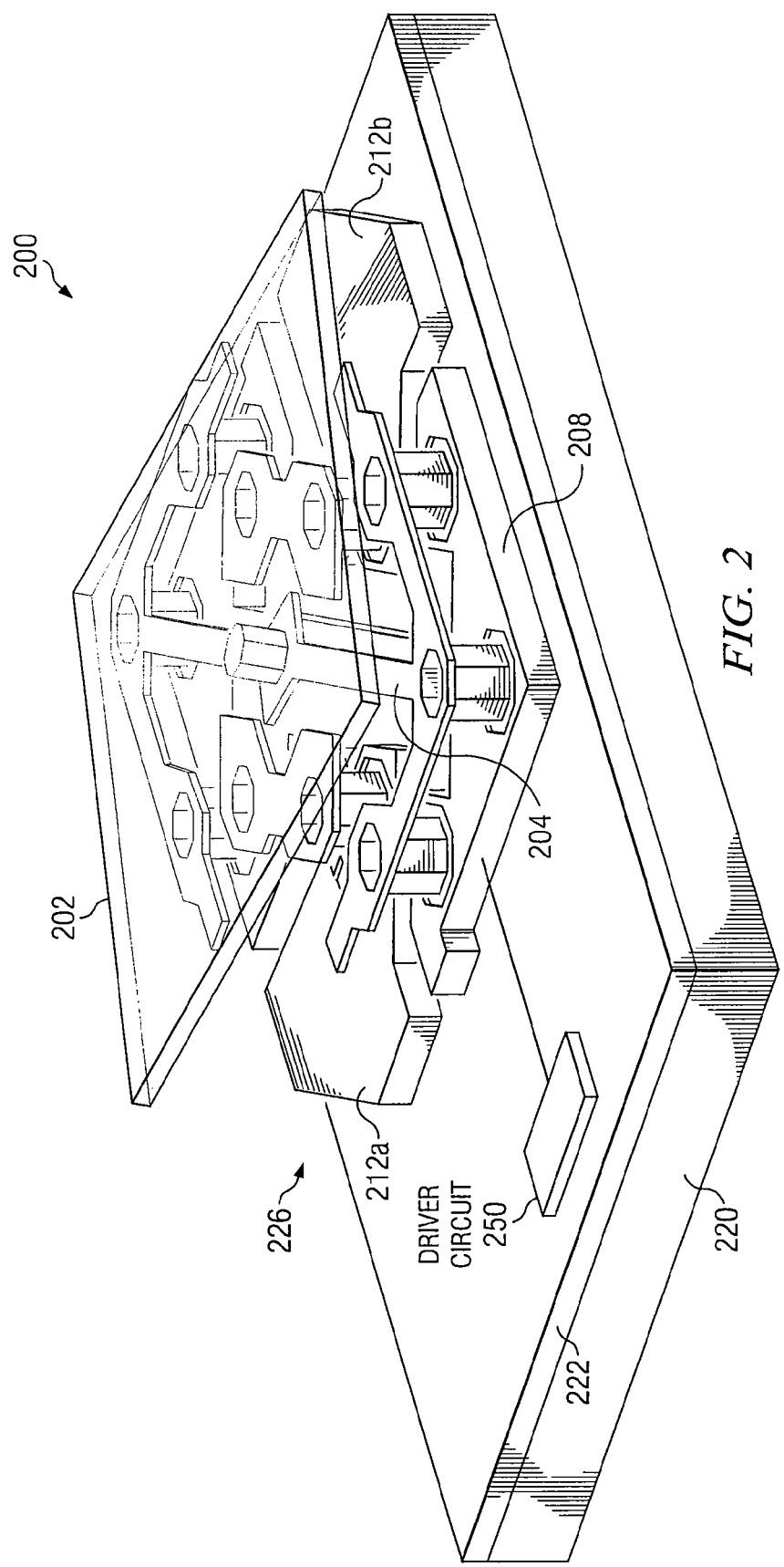
FIG. 2 is a perspective view of a portion of a microchip comprising a micromirror and a block diagram of the driving circuitry, according to particular embodiments.

Reset drivers 131-135 may be used to apply the biases that drive the actuation of micromirror arrays 141-145, respectively. Each driver 131-135 may be coupled to several individual micromirrors (FIG. 2 illustrates the connection to a single micromirror), typically arranged in rows, within a particular micromirror array (e.g., such as one of micromirror arrays 141-145). The multiple rows of micromirrors may result in a load capacitance up to 20 pF. In driving micromirror arrays 141-145, the timing values of the pulse widths of trpl (VRST pulse width) and tofs (VOFS pulse width) may be specified by the input digital controls. However, the generated waveforms may be delayed and contain non-ideal transition edges resulting in deviation from predefined trpl and tofs waveforms.

The direct current flow between two power supplies can lead to a dramatic increase in power consumption even if it only occurs for a short period of time. In particular embodiments, the level shifted driver control signals may be sequenced with pre-set separation times to accommodate their different delays and avoid direct current flows happening to the drivers at the transition edges of reset waveforms. In some embodiments, the shifted signals may be buffered using multiple stages of CMOS inverters which may be scaled according to the load capacitance.

To obtain a desirable reset waveform profile, transitions of VBIAS-to-VRST, VRST-to-VOFS and VOFS-to-VBIAS may show small delays and fast slew rates so that the pulse width deviation is suppressed to less than 10% of the desired pulse width. In particular embodiments, the analog drivers may have sharp transition edges and the output delay may be controlled under 40 nanoseconds from its digital input so that trpl and tofs deviate less than 10% of their pulse widths. The direct current flows between power supplies may be avoided by means of sharp waveform transitions and the use of separation times between sequential digital controls.

Reset drivers 131-135 may be integrated into the microchip substrate containing micromirror arrays 114-145. Accordingly, it may be desirable for reset drivers 131-135 to provide long-term reliable transistor operation, optimal current consumption and fast voltage transition (slew rates). In particular embodiments, the voltage level of the reset waveform used to reset micromirror arrays 141-145 may vary up to 30 volts. Accordingly, standard 3 volt digital and 7 volt analog transistors may not be sufficient. Some embodiments may use power transistors, such as asymmetric drain-extended transistors. These transistors may provide high gate-to-drain (VGD), body-to-drain (VBD) or drain-to-source (VDS) breakdown voltages. Thus, although the maximum gate-to-source (VGS) voltage remains 8.75 volts, same as the standard analog transistors, the maximum VDS and VBD may improve from 8.75 volts to 30 volts. Such a transistor may function reliably for more than $10^5$ hours if the transient reliability violation is less than 3 volts and the duty cycle of violation is controlled within 1-2% of the entire operation time.

Current consumption of the waveform-generating circuit may consist of static current consumed by the voltage generators, display current, and dynamic current consumed during micromirror transition. In particular embodiments, the reset waveform may be applied with a low duty cycle (about or below 1%). Because the high-end and low-end RC level shifters may drain currents during the duty cycle, a low duty cycle may result in the high transient display currents and dynamic current occurring during mirror transition being averaged to a moderate level.

In some embodiments, to obtain a fast slew rate at the reset waveform transition edges, the number of drivers 131-135 may be specified according to the magnitude of the load capacitance. Loaded with a large number of drivers, the charging/discharging process of level shifters 121-125 may cause large VMIDP/VMIDN variations. The variations may be compensated by strong output stages in voltage generator 110. Accordingly, in particular embodiments it may be desirable to optimize the circuit performance to meet the transistor reliability, power consumption and timing constraints simultaneously.

Each one of micromirror arrays 141-145 may comprise an array of thousands of individual micromirrors, such as micromirror 200 depicted in FIG. 2. The actual number of micromirrors may be application dependent. For example, in a Half-size Video Graphics Array (HVGA) application each micromirror array 141-145 may comprise 30,720 (320×96) micromirrors. The number of micromirrors being driven by drivers 131-135 may affect the display capacitance.

FIG. 2 is a perspective view of a portion of a microchip comprising a micromirror and a block diagram of the driving circuitry, according to particular embodiments. DMD 200 may be one of an array of hundreds of thousands of tilting micromirrors (e.g., micromirror 202) found on a single DMD microchip. Each micromirror 202 is generally a portion of a pixel element 226 fabricated monolithically over a complementary metal-oxide semiconductor ("CMOS") substrate 220. The CMOS substrate 220 also includes the various components of driver circuitry 250 operable to actuate micromirror 202. For simplicity, driver circuitry 250 is depicted as a single block. Driver circuitry 250 may contain a voltage generator (e.g., voltage generator 110), level shifters (e.g., level shifters 121-125), and reset drivers (e.g., reset drivers 131-135).

The mirror portion of each pixel element 226 in the illustrated embodiment includes micromirror 202 which may use a reflective material such as aluminum or other material to reflect incident light towards an image screen or a light absorber. In particular embodiments, the pixel pitch of the array of micromirrors 102 may be eleven micrometers or less. In particular embodiments, these relatively small pixels may comprise relatively strict timing requirements for the reset waveforms. This may make it desirable to integrate driver circuitry 250 locally on substrate 220. As compared to micromirror arrays having a pixel pitch of approximately 17 or more micrometers, the difference between the high-end and low-end voltages in a reset waveform are significantly reduced to below 30 v. This may allow for the use of drain-extended transistors into the traditional DMD memory electronics.

Hinges 204 may be used to tilt each micromirror 202 such that micromirrors 202 may be alternated between an active "on" state or an active "off" state to selectively communicate at least a portion of an optical signal or light beam.

The address portion of pixel element 226, in the illustrated embodiment, includes a pair of electrodes 212. Electrodes 212 may be capable of introducing an electrostatic coupling or attracting force between a portion of micromirror 202 and the address portion of pixel element 226. Pixel element 226 may also include mirror electrode 208. In particular embodiments, driver circuitry 250 may provide a bipolar reset waveform that may be applied to mirror electrode 208 to trigger transitions. The voltage of the waveform may vary from VBIAS to VRST, to VOFS and then back to VBIAS.

The creation of electrostatic fields within each pixel element 226 may be effected through any of a variety of means. For example, portions of the pixel element 226 may receive a bias voltage from driver circuitry 250 that at least partially contributes to the creation of the electrostatic forces (e.g., a voltage differential) between the address portions, which includes address electrodes 212 and micromirrors 202. In particular embodiments, the latching bias voltage comprises a steady-state voltage. That is, the bias voltage applied to micromirror 202 remains substantially constant while micromirror 202 is in an "on-state" or "off-state" position. In this example, the latching bias voltage comprises approximately sixteen volts. Although this example uses a bias voltage of sixteen volts, other latching bias voltages may be used without departing from the scope of the present disclosure.

FIGS. 3A, 3B, 3C and 3D are example components of a level shifter, according to particular embodiments. The depicted level shifters 300 comprise a combination of RC circuits 300a and 300b and comparators 300c and 300d. In the depicted embodiment, the output of each level shifter 300 is sent to a respective buffer 320. Depending on the embodiment and/or operational needs, particular embodiments may comprise RC circuits 300a and 300b, comparators 300c and 300d, or a combination of RC circuits 300a and 300b and comparators 300c and 300d.

Figure 3A:
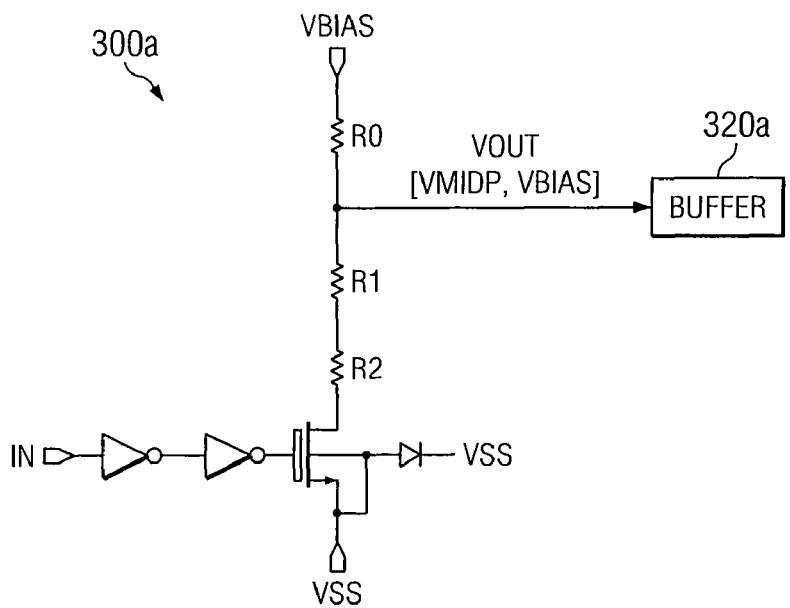
FIGS. 3A, 3B, 3C and 3D are example components of a level shifter, according to particular embodiments.
Figure 3B:
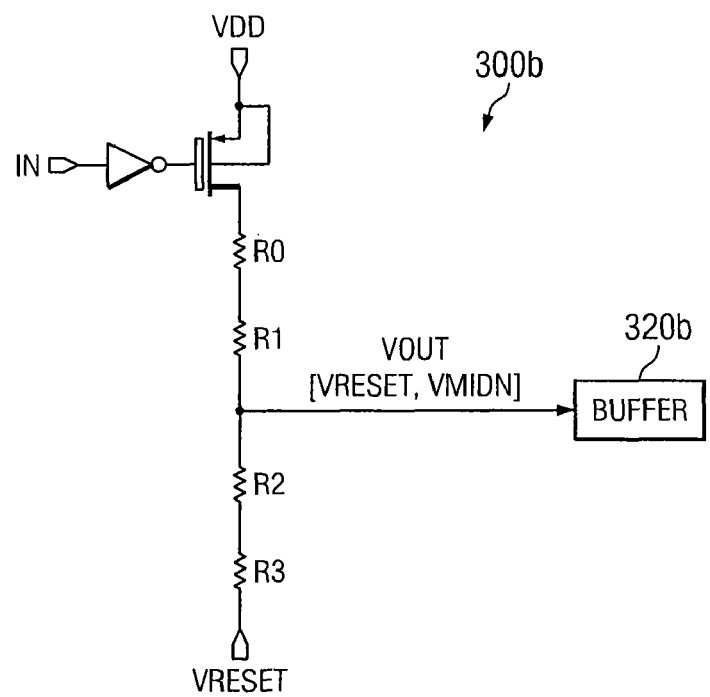

In FIG. 3A, RC circuit 300a comprises RC components which may be used to shift the voltage level up and in FIG. 3B, RC circuit 300b comprises RC components which may be used to shift the voltage level down. Thus, RC circuit 300a may be used as the high-end level shifter and RC circuit 300b may be used as the low-end level shifter. The use of RC circuits 300 as the low and high end level shifters may consume static power during a relatively short period of the duty cycle (e.g., around 1%). However, this configuration may spare the need for one positive and one negative intermediate voltage compared to an all comparator design. This, in turn, may spare the static power that would be consumed in generating the intermediate voltages. While the use of RC circuits 300a and 300b may reduce power consumption, the trade off may be in the speed and delay associated with shifting voltage levels.

Figure 3C:
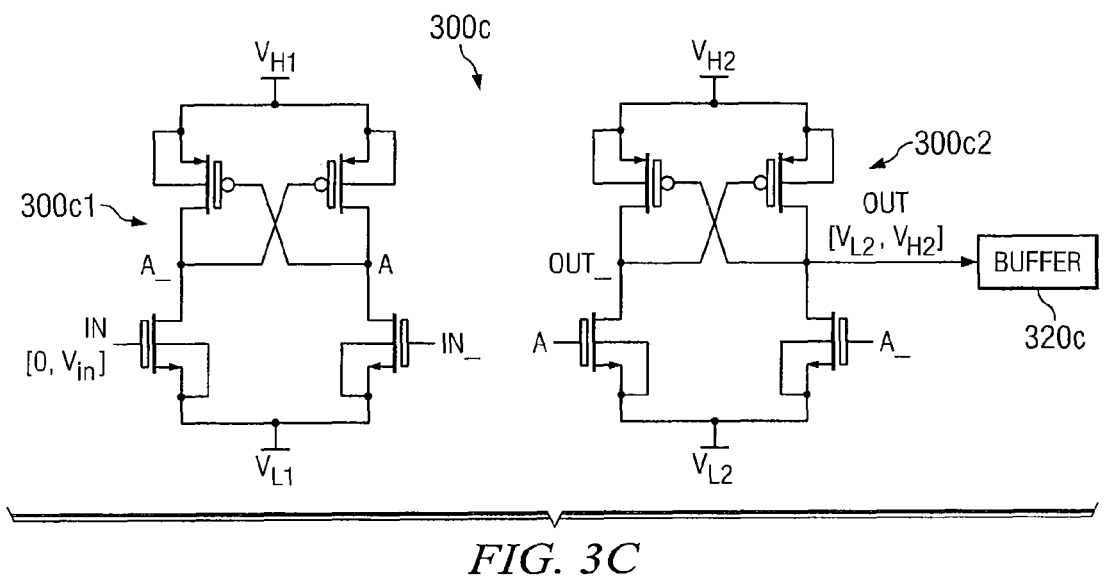
Figure 3D:
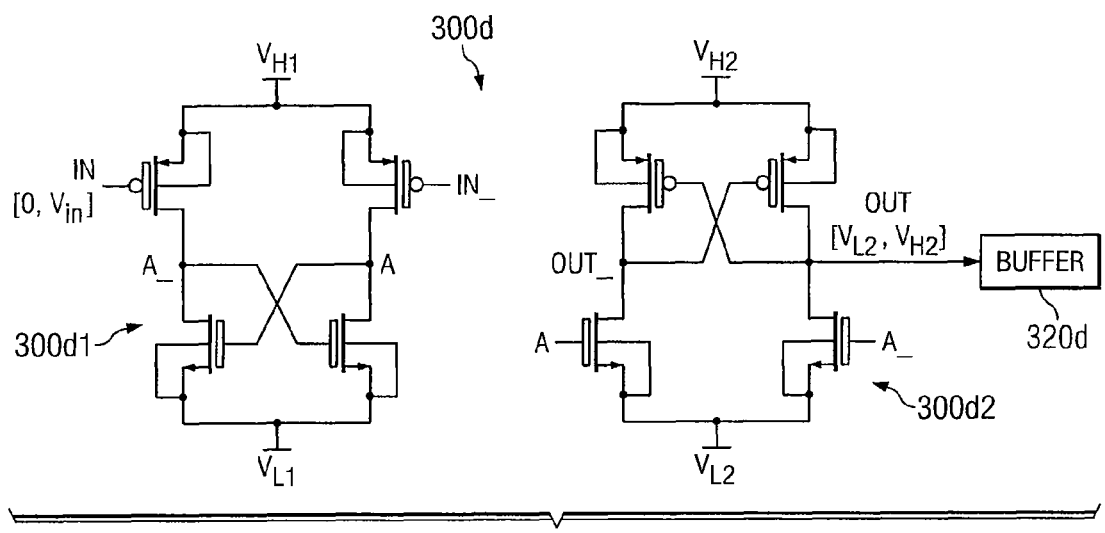

In FIG. 3C level shifter 300c comprises cascaded comparators which may be used to shift the voltage level up and in FIG. 3D level shifter 300d comprises cascaded comparators which may be used to shift the voltage level down. For example, in particular embodiments, comparators 300C may be able to convert an input signal [0, VDD (e.g., 2.5 volts)] to [0, VOFS], which may be further converted up to a higher non-overlapping voltage range of [VDD, VMIDP] using the two comparators 300c1 and 300c2 in consecutive stages. As another example, comparators 300d may be able to convert an input signal of [0,VDD] to a lower non-overlapping voltage range of [VMIDN, 0] using the two comparators 300d1 and 300d2 in consecutive stages.

Figure 4:
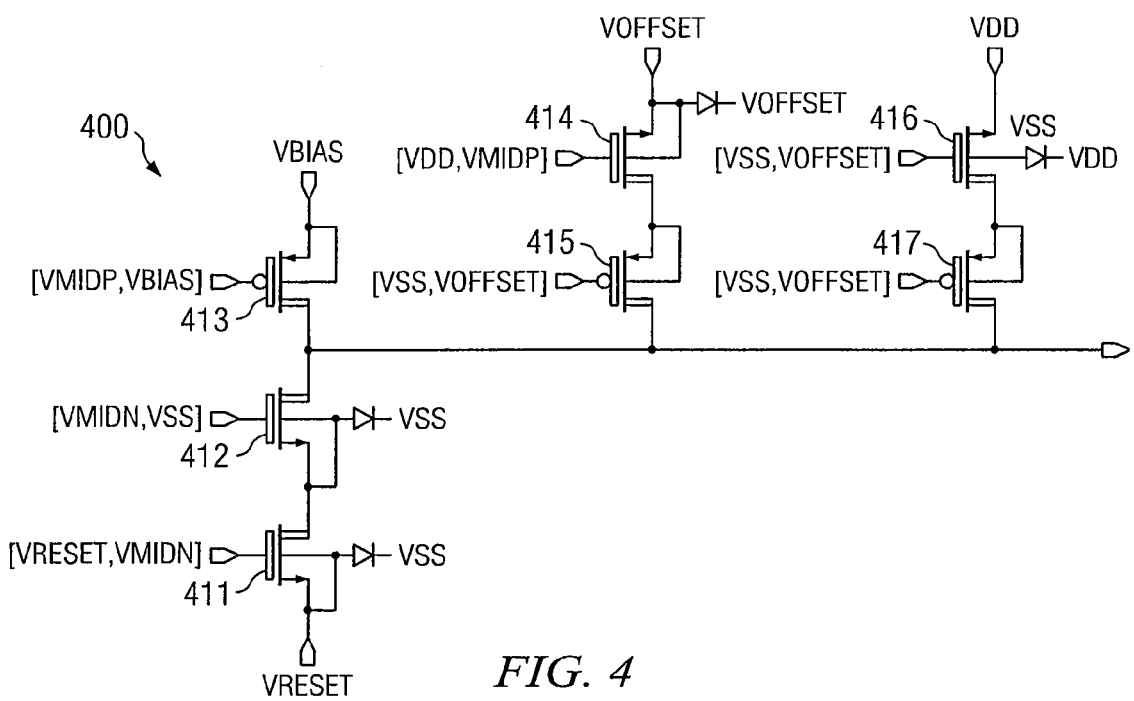
FIG. 4 is an example reset driver design, according to particular embodiments.

FIG. 4 is an example reset driver design, according to particular embodiments. The high-voltage driver 400 includes seven transistors 411-417 that may be used, in some combination, to generate the reset waveform that drives micromirror 202. Depending on the application, other embodiments may include more or less transistors that may be grouped in a similar or different manner. In particular embodiments, the transistors 411-417 may be controlled by different sequential voltages biased in different ranges. For example transistor 411 may be biased between VRST and VMIDN, transistor 412 between VMIDN and VSS (e.g. ground), transistor 413 between VMIDP and VBIAS, transistor 414 between VDD and VMIDP, and transistors 415-417 between VSS and VOFS. The shifted switching voltage biases may not only turn on the respective transistors to connect the proper supply to the output but may also efficiently avoid other power supplies from being connected and drawing direct current. For a moderate voltage output, cascaded PMOS and NMOS transistors (414 and 415, 416 and 417) may comprise gate biases that, in essence, block higher/lower voltages and solely output that specific voltage level. In particular embodiments, the input signals may first be shifted to proper analog levels then used to turn on the drivers and allow the mirror electrodes (e.g., address electrodes 208 and 212) to be connected to a desirable supply.

In particular embodiments, transistors 411-417 may be asymmetric drain-extended transistors. Using asymmetric drain-extended transistors may allow a high-voltage driving circuit to be integrated monolithically with the micromirror substrate. These transistors may have VGS voltages controlled under 8.75 volts despite their high VDS breakdown voltage (30 volts). As a result, two intermediate voltages (VMIDP and VMIDN) may need to be generated between VBIAS and VOFS and ground and VRSET, respectively, to provide the shifted driver-enabling voltages. In the depicted embodiment, driver 400 is powered by four supplies VBIAS, VOFS, VDD and VRST. The slew rates of a reset waveform pulse created using driver 400 may be relatively fast. In particular embodiments, in which drain-extended transistors having insufficient VDS tolerances (e.g., 20V) are used to drive high voltage (e.g., 30V), NMOS transistors (411 and 412) may be cascaded to eliminate the excessive voltage stress.

Although particular embodiments have been described a myriad of changes, variations, alterations, transformations, modifications and alternate embodiments may be suggested to one skilled in the art, and it is intended that particular embodiments encompass all, some or none of such changes, variations, alterations, transformations, and modifications as falling within the scope of the appended claims. For example, in FIG. 1, micromirror arrays 141-145 may be replaced with a different MEM component that requires electrostatic actuation. The intermediate voltage levels, transistor biases in drivers and the number of each basic block (driver, shifter and voltage generator) can be tailored with respect to application specific parameters, such as the actuator capacitance, actuation voltage and the transistor reliability tolerance.

What is claimed is:

1. A system for displaying modulated light, comprising:
a spatial light modulator comprising a plurality of micromirrors having a pixel pitch less than 17 micrometers;
at least two level shifters coupled to the intermediate voltage generator; and a reset driver coupled to the at least two level shifters and to at least a subset of the plurality of micromirrors, the reset driver operable to drive the subset of the micromirrors;

wherein the spatial light modulator, the at least two level shifters, and the reset driver are incorporated on a common substrate.

2. The system of claim 1, wherein the reset driver comprises at least one asymmetric drain-extended transistor.

3. The system of claim 1, wherein the reset driver is operable to produce a waveform having a peak-to-peak value less than 30 volts.

4. The system of claim 1, wherein the at least two level shifters comprise at least one comparator and at least one resistor-capacitor circuit.

5. The system of claim 1, wherein the at least two level shifters are operable to provide a low-power shift in voltage level to the reset driver.

6. The system of claim 1:
further comprising an intermediate voltage generator operable to generate a negative voltage and a positive voltage; and
wherein the spatial light modulator, the intermediate voltage generator, the at least two level shifters, and the reset driver are incorporated on a common substrate.

7. A digital micromirror device (DMD) microchip, comprising:
a plurality of micromirrors coupled to a substrate;
a plurality of reset drivers, each reset driver coupled to a subset of the plurality of micromirrors and to the substrate;
a plurality of level shifters, each level shifter coupled to at least one reset driver and to the substrate; and
at least one voltage generator coupled to each of the plurality of level shifters and the substrate.

8. The microchip of claim 7, wherein the plurality of reset drivers comprises a number of rest drivers based on a resolution for the digital micromirror device.

9. The microchip of claim 7, wherein each reset driver of the plurality of reset drivers comprises at least one asymmetric drain-extended transistor.

10. The microchip of claim 7, wherein each reset driver of the plurality of reset drivers is operable to produce a waveform having a peak-to-peak value less than 30 volts.

11. The microchip of claim 7, wherein each level shifter of the plurality of level shifters comprises at least one comparator and at least one resistor-capacitor circuit.

12. The microchip of claim 7, wherein each level shifter of the at least two level shifters is operable to provide a low-power shift in voltage level to the plurality of reset drivers.

13. The microchip of claim 7, wherein the voltage generator is operable to produce intermediate voltages ranging from −3 to 11 volts.

14. A micro electro mechanical (MEM) device, comprising:
one or more MEM components coupled to a substrate and operable to be actuated by an applied bias;
one or more reset drivers coupled to the substrate and operable to apply a bias to the MEM components; and
one or more level shifters coupled to the reset drivers and voltage generators, the level shifters operable to provide a low-power shift in voltage level to the reset drivers.

15. The MEM device of claim 14, wherein the reset drivers comprise a first number of reset drivers, the first number of reset drivers based on a second number of MEM components coupled to the substrate.

16. The MEM device of claim 14, wherein each of the reset drivers comprise at least one asymmetric drain-extended transistor.

17. The MEM device of claim 14, wherein each of the reset drivers is operable to produce a waveform having a peak-to-peak value less than 30 volts.

18. The MEM device of claim 14, wherein each of the level shifters comprises at least one comparator and at least one resistor-capacitor circuit.

19. The MEM device of claim 14, wherein each of the MEM components is a micromirror.

20. The MEM device of claim 14, further comprising one or more voltage generators coupled to the substrate and operable to generate an intermediate voltage.

* * * * *